United States Patent
Babel et al.

(10) Patent No.: US 10,228,245 B2
(45) Date of Patent: Mar. 12, 2019

(54) ALTITUDE ESTIMATOR FOR A DRONE

(71) Applicant: PARROT DRONES, Paris (FR)

(72) Inventors: Mathieu Babel, Paris (FR); Nicolas Texier, Paris (FR); Nicolas Martin, Eaubonne (FR)

(73) Assignee: PARROT DRONES, Paris (FR)

( * ) Notice: Subject to any disclaimer, the term of this patent is extended or adjusted under 35 U.S.C. 154(b) by 92 days.

(21) Appl. No.: 15/416,213

(22) Filed: Jan. 26, 2017

(65) Prior Publication Data

US 2017/0211933 A1    Jul. 27, 2017

(30) Foreign Application Priority Data

Jan. 26, 2016  (FR) ..................... 16 50605

(51) Int. Cl.
*G01C 5/06* (2006.01)
*B64C 39/02* (2006.01)
*G05D 1/00* (2006.01)
*G01C 23/00* (2006.01)

(52) U.S. Cl.
CPC .............. *G01C 5/06* (2013.01); *B64C 39/024* (2013.01); *G01C 23/00* (2013.01); *G05D 1/0016* (2013.01); *B64C 2201/027* (2013.01); *B64C 2201/127* (2013.01); *B64C 2201/146* (2013.01)

(58) Field of Classification Search
CPC ........ B64C 2201/027; B64C 2201/127; B64C 2201/146; B64C 39/024; G01C 23/00; G01C 5/06; G05D 1/0016
See application file for complete search history.

(56) References Cited

U.S. PATENT DOCUMENTS

| 5,349,347 | A | 9/1994 | Muller | |
| 6,798,378 | B1* | 9/2004 | Walters | G01C 5/00 342/357.57 |
| 6,819,983 | B1 | 11/2004 | McGraw | |
| 9,592,910 | B1* | 3/2017 | Beckman | B64C 27/463 |
| 2011/0213554 | A1* | 9/2011 | Archibald | G01V 9/007 702/6 |
| 2013/0325217 | A1* | 12/2013 | Seydoux | A63H 27/12 701/4 |

(Continued)

OTHER PUBLICATIONS

National Institute of Industrial Property (France), French Search Report, dated Sep. 28, 2016, pp. 1-6.

*Primary Examiner* — Francis C Gray
(74) *Attorney, Agent, or Firm* — Sheppard Mullin Richter & Hampton LLP

(57) ABSTRACT

A drone including a barometric sensor adapted to deliver a drone altitude signal; a sensor for measuring the attitude of said drone, adapted to estimate at least one angle of attitude of the drone, and altitude determination means adapted to deliver a drone altitude value, expressed in an absolute terrestrial reference system. The drone includes a relative wind speed sensor adapted to measure the relative wind speed and the altitude determination means includes a device for memorizing predetermined altitude compensation data, an altitude estimator receiving as an input the signals delivered by the attitude measurement sensor and by the relative wind speed sensor and by the barometric sensor and combining these signals with the altitude compensation data memorized in the memorized device to output the estimated drone altitude value.

5 Claims, 3 Drawing Sheets

(56) References Cited

U.S. PATENT DOCUMENTS

2016/0180126 A1\* 6/2016 Saleem .................. H04N 7/185
　　　　　　　　　　　　　　　　　　　　348/144
2017/0001724 A1\* 1/2017 Yates .................... B64C 39/024
2017/0264907 A1\* 9/2017 Barre ............... H04N 21/85406

\* cited by examiner

ALTITUDE ESTIMATOR FOR A DRONE

CROSS-REFERENCE TO RELATED APPLICATIONS

This application claims priority to French patent application No. 1650605 filed on Jan. 26, 2016.

BACKGROUND

Fixed-wing drones are provided with at least one rotor driven by at least one respective motor. Rotary-wing drones are provided with multiple rotors driven by respective motors which can be controlled in a differentiated manner so as to pilot the drone in attitude and speed. A typical example of such a drone is the AR.Drone, the Bebop Drone or the Bebop 2 of Parrot SA, Paris, France, which is a quadricopter equipped with a series of sensors (accelerometers, 3-axis gyrometers, altimeters), a front camera capturing an image of the scene towards which the drone is directed, and a vertical-view camera capturing an image of the overflown ground.

International patent WO 2010/061099 A2 and European patent EP 2 364 757 A1 (Parrot SA) describe such a drone as well as the principle of piloting thereof through a touch-screen multimedia telephone or media player having an integrated accelerometer, for example a cellular phone of the iPhone® type or a multimedia player or tablet of the iPod Touch® or iPad® type. The drone is piloted by the user by means of signals emitted by the apparatus inclination sensor, the inclinations being replicated by the drone: for example, to make the drone move forward, the user tilts his apparatus about the pitch axis thereof, and to move the drone aside to the right or to the left, he tilts this apparatus with respect to the roll axis thereof. That way, if the drone is controlled so as to tilt or "dive" downward (inclination according to a pitch angle), it will move forward with a speed that is all the more high that the inclination angle is significant; conversely, if it is controlled so as to "nose up" in the opposite direction, its speed will progressively slow down, then will invert, going back rearward. In the same way, for controlling the inclination about a roll axis, the drone will lean to the right or to the left, causing a linear displacement in horizontal translation to the right or to the left. The user has at his disposal other commands, which are displayed on the touch screen, in particular "move up/move down" (throttle control) and "rotation to the right/rotation to the left" (rotation of the drone about its yaw axis).

BRIEF SUMMARY

The present disclosure relates to the drones, in particular the rotary-wing drones such as quadricopters and the like and the fixed-wing drones. The present disclosure also relates to the evaluation of the altitude at which the drone flies.

As used herein, the word "altitude" means the value of the instantaneous position of the drone in the vertical direction, considered in a fixed terrestrial reference system such as a Galilean reference system, whose altitude zero corresponds to the position of the drone on the ground. This "altitude" is hence an absolute magnitude.

The drone such may be provided with an ultrasonic range finder, also called US sensor, including an electroacoustic transducer for emitting and receiving ultrasounds. This transducer emits a short ultrasound burst of a few tens or hundreds of microseconds, then waits for the acoustical echo return sent back after reflection to the ground. The time period separating the burst emission from the echo reception makes it possible—the velocity of sound being known—to estimate the length of the acoustic path travelled and thus to evaluate the distance separating the drone from the reflecting surface. In reality, insofar as the beam of the US sensor is rather wide (typically a cone of opening angle of about 55°), the transducer most often receives a multiplicity of echoes, and discriminates which of these echoes corresponds to the closest point. This measurement is iterated at close intervals, with a typical frequency of recurrence of the ultrasound bursts of 25 Hz.

Such an altitude estimator implementing an ultrasonic range finder is described for example in European patent EP 2 400 460 A1 (Parrot SA), where it is used in particular to calculate a scale factor to be applied to successive images of the terrain overflown by the drone, used in particular to appreciate the horizontal speed of the latter with respect to the ground, in combination with the accelerometer data.

The result provided by an ultrasonic range finder, hereinafter called "distance", is in any case a relative magnitude, function of the relief of the terrain overflown by the drone. Indeed, the measured distance may be different from the altitude (within the meaning indicated hereinabove), in particular when it occurs that the drone passes over an obstacle, for example if it flies, at constant altitude, over a table or a wall: for the duration of this flight, the distance measured by the ultrasonic range finder will abruptly decrease, even as the altitude will not have varied. If only the indications of the range finder are considered, there is hence a risk to make the drone perform "terrain following", which is not the searched objective, in particular an uneven terrain, when it is only desired to maintain the altitude at a stable value.

Embodiments of the present disclosure aim to solve a certain number of problems resulting from this phenomenon, as well as other drawbacks peculiar to the ultrasonic range-finding sensors. These sensors have the following characteristics:

the measurement produced is only a relative measurement of altitude (range finding, distance measurement);
in real situation, the measurement is very noisy, due to multiple echoes reflected by the ground, to the more or less reflective terrain and to frequent signal disappearances, for example when the drone flies over an absorbing terrain (shrubs . . . );
the range is limited, about 6 m in the case of the AR.Drone described in the above-mentioned documents, and, beyond this value, the range-finding signal abruptly disappears;
on the other hand, the measurement is very rapid, it may be reiterated at high frequency (typically 25 Hz), and its accuracy is excellent, of the order of a few centimeters on a measurement scale ranging from a few tens of centimeters to several meters.

To compensate for these drawbacks, it is possible to use, in combination with the range-finding sensor, another type of sensor, i.e. a pressure sensor, or barometric sensor, as described in European patent EP 2 644 240 A1 (Parrot SA). A barometric sensor allows measuring the variations of pressure during the flight, such variations being correlated to the variations of altitude. It is therefore possible to obtain an absolute measurement of the altitude by integrating these variations from an altitude zero at the time of takeoff.

A barometric sensor has the following characteristics:
it provides an absolute measurement, independent on the overflown terrain;

it can be used at high altitude, with no upper limit;
on the other hand, it is slow and rather inaccurate, insofar as it is necessary to integrate pressure variations;
besides, it is subject to aerodynamic disturbance, in particular at low altitude, due to the ground effect, when the rotors of the drone produce high turbulences making the signals delivered by the pressure sensor unusable.

A barometric sensor is a pressure sensor measuring the static pressure that gives an indication of the altitude. This altitude should be independent of the drone movement. Moreover, the drones, due to their size, have constraints of integration of the different sensors equipping the drone because they must be positioned on small electronic boards (the smallest possible) and be positioned in small-size places. Moreover, these size constraints of the drone have an impact on the weight, autonomy, stability and cost constraints.

Due to all these constraints, the barometric sensor is very often positioned in a cavity, the closed cavity being formed by means of relatively flexible materials. Such an assembly has the following drawback. During the flight of the drone, the relative velocity of air applies on the external surface of the drone a dynamic pressure causing a deformation of the drone structure and modifies the static pressure inside the cavity, in particular inside the cavity housing the barometric sensor. The static pressure of the cavity containing the barometric sensor being modified, the altitude detected by the barometric sensor is hence erroneous.

Hence, embodiments of the present disclosure provide a drone including altitude determination means provided with means for potentially readjusting the detected altitude measurement, which makes it possible to overcome this difficulty in any circumstances.

The present disclosure proposes for that purpose a drone such as disclosed by the above-mentioned European patent EP 2 644 240 A1, comprising: a barometric sensor adapted to deliver a drone altitude signal; at least one sensor for measuring the attitude of said drone, adapted to estimate at least one attitude angle of the drone, and altitude determination means adapted to deliver a drone altitude value, expressed in an absolute terrestrial reference system.

Characteristically of the present disclosure, the drone may include one relative wind speed sensor adapted to measure the speed of the relative wind, and the altitude determination means comprise:
a device for memorizing predetermined altitude compensation data,
an altitude estimator receiving as an input the signal delivered by said at least one attitude measurement sensor and by said at least one relative wind speed sensor and by the barometric sensor and combining these signals with the altitude compensation data memorized in the memorization device to output the estimated drone altitude value.

According to various advantageous subsidiary characteristics:
the altitude estimator is adapted to periodically determine the estimated altitude as a function of the signals delivered by said at least one attitude measurement sensor and by said at least one relative wind speed sensor and by the barometric sensor.
attitudes of said drone comprise the pitch and/or the roll.
the device for memorizing predetermined altitude compensation data comprises altitude compensation data previously determined by measurement of the disturbances caused to said drone.
the altitude estimator comprises a device for determining the compensation to be applied and a device for calculating the estimated altitude.
the device for determining the compensation to be applied determines the compensation to be applied based on the signals delivered by said at least one attitude measurement sensor and by said at least one relative wind speed sensor and by combining these signals with the altitude compensation data memorized in the memorization device and the device for calculating the estimated altitude comprises means adapted to add the altitude delivered by the barometric sensor and the compensation to be applied to determine the estimated altitude.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments of the present disclosure. These drawings are provided to facilitate the reader's understanding of the technology disclosed herein and shall not be considered limiting of the breadth, scope, or applicability of the invention.

These figures are not intended to be exhaustive or to limit the invention to the precise form disclosed. It should be understood that embodiments disclosed herein can be practiced with modification and alteration, and that the invention be limited only by the claims and the equivalents thereof.

DETAILED DESCRIPTION

The present disclosure relates to the drones, in particular the rotary-wing drones such as quadricopters and the like and the fixed-wing drones.

Figure 1:
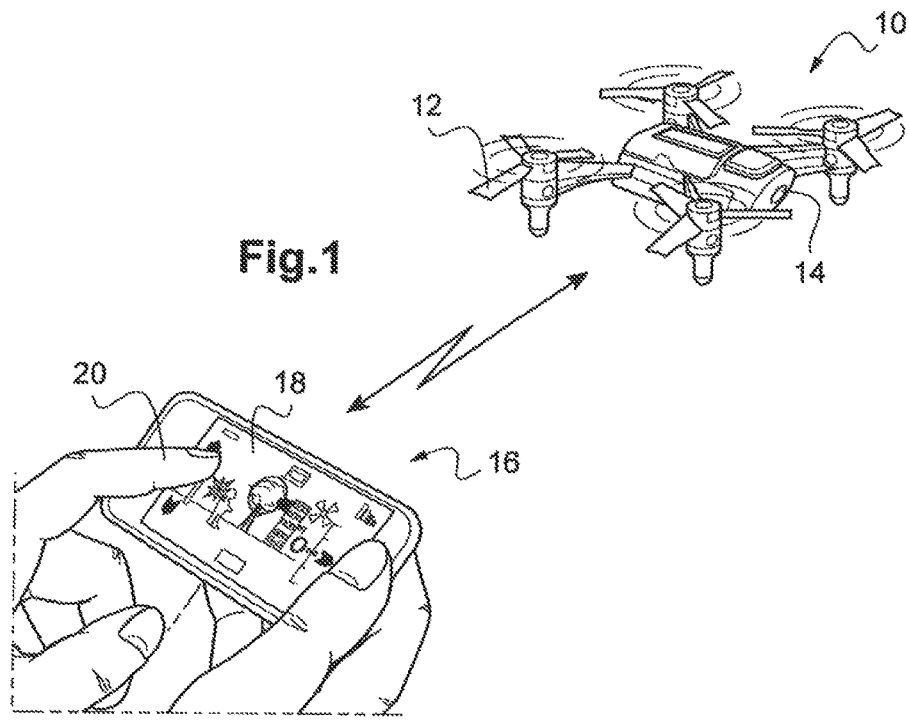
FIG. 1 is an overall view showing the drone and the associated remote-control apparatus for the remote piloting thereof, consistent with embodiments disclosed herein.

In FIG. 1, the reference 10 generally denotes a drone, for example a rotary-wing drone of the quadricopter type, such as the above-mentioned AR.Drone, Bebop Drone and Bebop 2, described in the WO 2010/061099 A2 and EP 2 364 757 A1, as well as FR 2 915 569 A1 (which describes in particular the gyrometer and accelerometer system used by the drone) and EP 2 431 084 A1 (which describes in particular the way to control predetermined trajectories).

According to embodiments disclosed herein, the drone may also be a fixed-wing drone, in particular of the "sailwing" type such as, for example, the eBee model of SenseFly, Cheseaux-Lausanne, Swiss, which is a professional land mapping drone, or the Disco model recently presented by Parrot SA, Paris, France.

The drone 10 illustrated in FIG. 1 includes four coplanar rotors 12 whose motors are piloted independently from each other by an integrated system of navigation and control of attitude.

The drone is provided with a first front-view camera 14 making it possible to obtain an image of the scene towards which the drone is directed, as well as a second front-view camera, pointing downward to capture successive images of the overflown terrain and used in particular to evaluate the speed of the drone with respect to the ground, in combination with accelerometer data, thanks to a software that estimates the displacement of the scene captured by the camera from one image to the following one and applies to this estimated displacement a scale factor function of the measured altitude. This technique is described in detail in the above-mentioned document EP 2 400 460 A1, to which reference may be made for further details.

As shown in FIG. 1, the drone 1 is piloted by a remote remote-control apparatus 16 provided with a touch screen 18 displaying the image captured by one of the front cameras of the drone, with in superimposition a certain number of symbols allowing the activation of piloting commands by simple contact of a user's finger 20 on the touch screen 18. The apparatus 16 is provided with inclination sensors making it possible to control the drone attitude. Moreover, the remote-control apparatus may display drone status data, in particular the drone altitude.

For the bidirectional exchange of data with the drone, the remote remote-control apparatus 16 is also provided with radio link means, for example of the Wi-Fi (IEEE 802.11) or Bluetooth® local network type. The remote-control apparatus 16 is advantageously consisted by a touch-screen multimedia telephone or media player having an integrated accelerometer, for example a cellular phone of the iPhone type, a player of the iPod Touch® type or a multimedia tablet of the iPad® type, which are apparatuses incorporating the various control elements required for the display and the detection of the piloting commands, the visualization of the image captured by the front camera, and the bidirectional exchange of data with the drone by WiFi or Bluetooth® link.

The piloting of the drone 10 may include making the latter evolve by controlling the motors in a differentiated manner to generate, according to the case, movements of:
- rotation about a pitch axis, to make the drone move forward or rearward; and/or
- rotation about a roll axis, to move the drone aside to the right or to the left; and/or
- rotation about a yaw axis, to make the drone main axis pivot to the right or to the left; and/or
- translation downward or upward by changing the gas control, so as to reduce or increase, respectively, the drone altitude.

The drone has also an automatic and autonomous system of hovering flight stabilization (auto-piloted, "fixed point" configuration), activated in particular as soon as the user removes his finger from the touch screen of the apparatus, or automatically at the end of the take-off phase, or in case of interruption of the radio link between the apparatus and the drone. The drone then passes to a lift condition in which it will be automatically immobilized and stabilized, with no intervention of the user.

Figure 2:
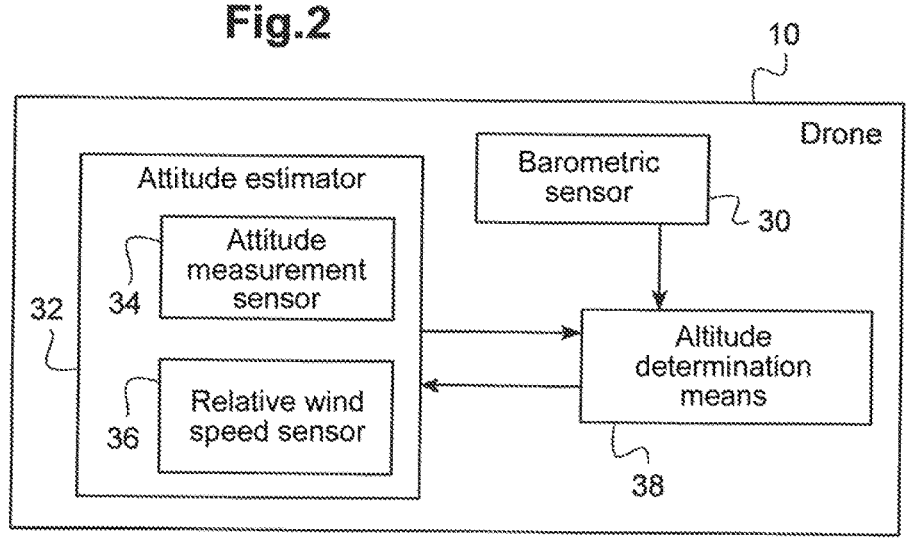
FIG. 2 is a block diagram of the main elements of the drone allowing the estimation of the drone altitude, consistent with embodiments disclosed herein.

In FIG. 2, the main elements of the drone allowing the estimation of the drone altitude is shown. These elements are present on any type of drone, in particular the rotary-wing drones and the fixed-wind drones. The drone 10 comprises on board a barometric sensor 30, adapted to deliver a drone altitude variation signal and hence to provide measurements that give the altitude of the drone with respect to the ground.

The barometric sensor is very often positioned in a closed cavity, the cavity being formed by means of relatively flexible materials.

The drone 10 further comprises an attitude estimator 32 allowing to obtain measurements of the drone behavior. For that purpose, it comprises one or several attitude measurement sensors 34. Examples of sensors are the inertial sensors (accelerometers and gyrometers) making it possible to measure with a certain accuracy the angular speeds and at least one angle of attitude of the drone, i.e. the Euler angles describing the inclination of the drone with respect to a horizontal plane of a fixed terrestrial reference system. Moreover, the drone, in particular the attitude estimator 32, comprises at least one relative wind speed sensor 36 adapted to measure the relative wind speed.

In some embodiments, the drone 10 also includes drone altitude determination means 38 adapted to deliver a drone altitude value, expressed in an absolute terrestrial reference system. The barometric sensor 30 being very often positioned in a cavity whose structure is liable to be deformed when the drone flies, the static pressure inside the cavity will vary during the drone flight and hence the altitude detected by the barometric sensor 30 is hence erroneous.

Figure 3:
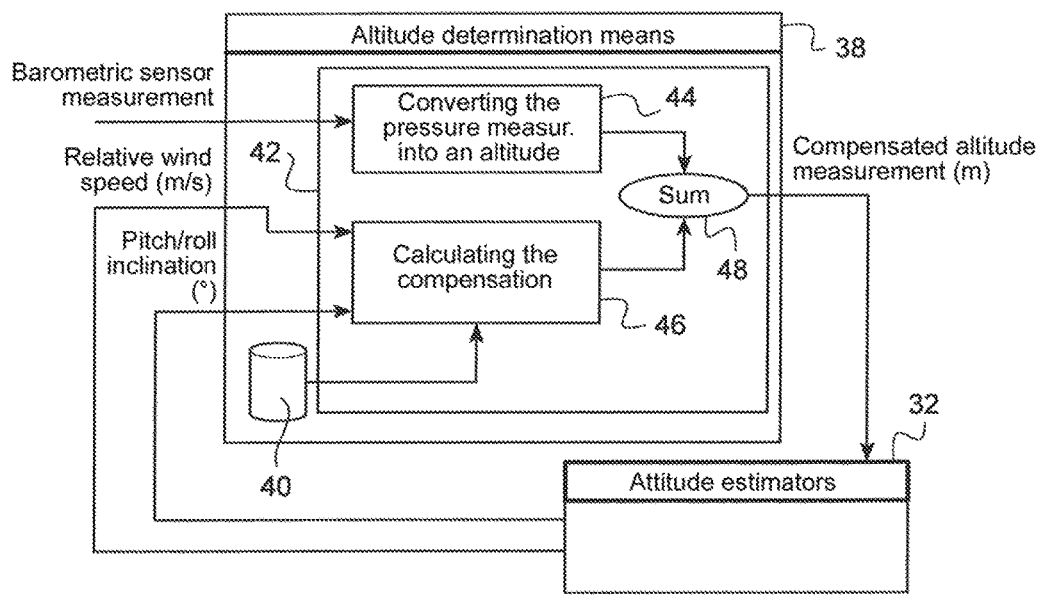
FIG. 3 is a block diagram of the different elements of the altitude determination means, consistent with embodiments disclosed herein.

As illustrated in FIG. 3, in order to correct the altitude detected by the barometric sensor 30 of the drone, whatever the drone, i.e. in particular of the fixed-wing or the rotary-wing type, the altitude determination means 38 comprise an altitude estimator 42 adapted to estimate the real altitude of the drone based on drone attitude and relative wind speed data, and also based on altitude compensation data memorized in a memorization device 40 to output the estimated drone altitude value.

According to an embodiment, the device 40 for memorizing predetermined altitude compensation data comprises for a set of possible drone attitudes and of particular relative wind speeds, altitude compensation data previously determined by means of measurements of disturbance caused to said drone.

In particular, these compensation data are determined for example by measurements performed on test stands, in particular in a wind tunnel, in order to determine the difference between the altitude detected by the barometric sensor 30 and the real altitude as a function in particular of drone attitude and relative wind speed data.

According to a particular embodiment of the compensation data determination, a map integrating the values measured by the barometric sensor 30, called raw measurements, in different conditions of relative wind speed and drone attitude is created in a wind tunnel.

In order to reduce the errors of measurement of the barometric sensor 30, a plurality of raw measurements may be made for each condition of relative wind speed and drone attitude, then a averaging of these raw data measured is performed.

Hence, raw measurements of the barometric sensor 30 are performed for a set of drone attitudes, i.e. of pitch angle and/or roll angle, and for different relative wind speeds. The measurements may be performed in a particular room that has a given pressure. Hence, for each raw value measured, the static pressure drift in the barometer housing is determined at each test and the correction to be applied to the raw altitude measurement detected by the barometric sensor is hence determined for each attitude of the drone with respect to the relative wind speed.

Altitude compensation data are hence established for a set of attitudes of the drone and for a set of relative wind speed data.

The table hereinafter illustrates an example of compensation data to be applied to the altitude value detected by the barometric sensor when the drone has a roll of 40° and no pitch angle.

TABLE 1

| Relative wind speed | Roll of 40° | Roll of −40° |
| --- | --- | --- |
| −30 m/s | −10 m | −10 m |
| −10 m/s | −2 m | −2 m |
| 0 m/s | 0 m | 0 m |

Hence, according to this example, when the drone has a roll angle of 40° and the relative wind speed is of −30 m/s, then the altitude detected by the barometric sensor must be adjusted by −10 m.

Likewise, according to this example, when the drone has a roll angle of 40° and the relative wind speed is of −10 m/s, then the altitude detected by the barometric sensor must be adjusted by −2 m.

As shown in FIG. 3, the altitude determination means 38 comprise an altitude estimator 42, receiving as an input the signals delivered by said at least one attitude measurement sensor 34 of said drone and by said at least one relative wind speed sensor 36 and by the barometric sensor 30 and combining these signals with the altitude compensation data memorized in the memorization device 40 to output said estimated drone altitude value.

According to a particular embodiment, the drone 10 comprises a device 44 for converting the pressure measurement delivered by the barometric sensor into a detected altitude measurement. According to an exemplary embodiment, the device for converting the pressure measurement is comprised in the altitude estimator. According to an alternative embodiment, the device for converting the pressure measurement 44 is located upstream of the altitude estimator 42.

According to a particular embodiment, the altitude estimator 42 comprises a device 46 for determining the compensation to be applied and a device 48 for calculating the estimated altitude.

The device 46 for determining the compensation to be applied determines the compensation to be applied to the detected altitude, based on the signals delivered by said at least one attitude measurement sensor 34 and by said at least one relative wind speed sensor 36 and by combining these signals with the altitude compensation data memorized in the de-vice 40 for memorizing predetermined altitude compensation data.

According to a particular embodiment of the compensation determination device 46, the latter determines for each attitude angle, in particular the pitch angle and the roll angle, the compensation to be applied to the detected altitude. The total compensation to be applied corresponds to the sum of the compensations determined for each drone attitude angle. Hence, the compensation determination device 46 delivers that way the total compensation determined to be applied to the altitude detected by the barometric sensor 30.

According to a particular embodiment, when the signals delivered by said at least one attitude measurement sensor 34 of said drone and by said at least one relative wind speed sensor 36 do not correspond to data memorized in the memorization device 40 but are located between memorized data, then an interpolation of the compensation data is performed based on the closest memorized attitude and relative wind speed data so as to determine at best the compensation to be applied to the altitude detected by the barometric sensor.

The device 48 for calculating the estimated altitude comprises means adapted to add the altitude delivered by the barometric sensor 30 or by the device 44 for converting the pressure measurement and the compensation determined by the compensation determination device 46 to estimate the altitude of the drone.

According to a particular embodiment, the altitude estimator 42 is adapted to determine periodically or on demand the altitude of the drone as a function of the signals delivered by said at least one drone attitude sensor and by said at least one relative wind speed sensor and by the barometric sensor.

Figure 4:
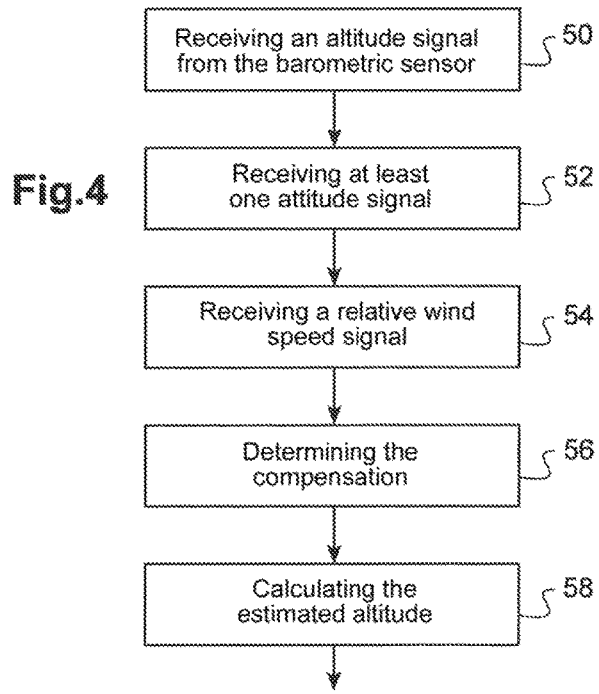
FIG. 4 is a flow diagram of the determination of the estimated altitude, consistent with embodiments disclosed herein.

FIG. 4 shows a step diagram illustrating the method of determination of the estimated altitude according to some embodiments of the disclosure, implemented in particular in the altitude determination means 38. This method may include a step 50 of receiving signals from the barometric sensor corresponding to the altitude detected by the barometric sensor.

In some embodiments, this step may be followed by the step 52 of receiving signals delivered by the attitude measurement sensor comprising in particular the pitch and/or the roll. The step 52 may be followed by the step 54 of receiving a relative wind speed measurement signal. The step 54 may be followed by the step 56 of determining the compensation to be applied to altitude detected based on the drone attitude measurement and the relative wind speed measurement. In various embodiments, the steps described above may be performed in different orders, or some steps may be omitted.

According to a particular embodiment, the determination of the compensation is performed for each of the attitude angles of the drone, in particular, for the pitch and the roll. Hence, if the drone has a pitch angle and no roll angle, then a single value of compensation will be determined. If, on the contrary, the drone has a pitch angle and a roll angle, then two compensations to be applied are determined, one for each attitude angle of the drone. Hence, the total compensation to be applied is then determined by the sum of the determined compensations.

The step 56 may be followed by a step 58 of calculating the altitude estimated based on the altitude detected at step 50 and the compensation to be applied determined at step 56. In particular, the estimated altitude is the sum of the altitude detected and of the determined compensation to be applied.

This method may be implemented each times it is necessary to know to the nearest the drone altitude. According to another embodiment, it may be implemented on a regular basis, for example every two seconds. It is to be noted that the steps 50 to 52 may be executed in a different order or in parallel.

The altitude estimated by the altitude determination means 38 is provided at the input of the attitude estimator device 32. The latter implements for example a state estimator of the "Kalman filter" type, which is an infinite impulse response filter that estimates the states of a dynamic system (the drone in the present case) based on a series of measurements applied at the input. The general principles of the technique will be found for example in R. E. Kalman, A new Approach to Linear Filtering and Prediction Problems, Transactions of the ASME—Journal of Basic Engineering, Vol. 82 (1960).

Figure 5:
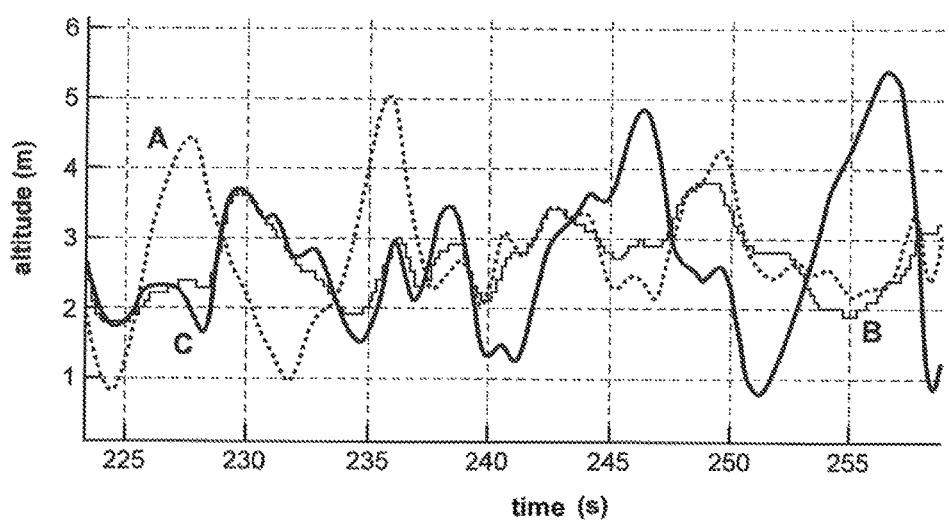
FIG. 5 is a chronogram showing the estimated altitude measurement after correction, consistent with embodiments disclosed herein.

FIG. 5 illustrates the drone estimated altitude from the altitude determination means according to some embodiments disclosed herein. FIG. 5 illustrates, at the line denoted A, the altitude measurement detected by the barometric sensor 30, whereas the line denoted B shows the real altitude obtained by a geolocation device (GPS device). It may be observed that, during a very dynamic flight of the drone, the measurement of the barometric sensor 30 is very disturbed with respect to the altitude measurement made by a geolocation device. After application of the altitude determination method by the altitude determination means 38 according to embodiments disclosed herein, the estimated altitude of the drone is shown by a line denoted C. It may be observed that the altitude estimated according to embodiments disclosed herein is very close to the altitude value measured by the geolocation device.

While various embodiments of the disclosure have been described above, it should be understood that they have been presented by way of example only, and not of limitation. Likewise, the various diagrams may depict an example architectural or other configuration for the drone, which is done to aid in understanding the features and functionality that can be included in the drone. Embodiments of the disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the technology of the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A drone comprising:
   a barometric sensor adapted to deliver a drone altitude signal;
   at least one sensor for measuring the attitude of said drone adapted to estimate at least one attitude angle of the drone;
   at least one relative wind speed sensor adapted to measure the relative wind speed; and
   altitude determination means adapted to deliver a drone altitude value, expressed in an absolute terrestrial reference system;
   wherein the altitude determination means comprise:
   a first device for memorizing predetermined altitude compensation data;
   an altitude estimator receiving as an input the signal delivered by said at least one attitude measuring sensor and by said at least one relative wind seep sensor and by the barometric sensor and combining these signals with the altitude compensation data memorized in the first device to output the estimated drone altitude value; and
   wherein the altitude estimator comprises a second device for determining the compensation to be applied and a third device for calculating the estimated altitude.

2. The drone according to claim 1, wherein the altitude estimator is adapted to determine periodically the estimated altitude as a function of the signals delivered by said at least one attitude measurement sensor and by said at least one relative wind speed sensor and by the barometric sensor.

3. The drone according to claim 1, wherein the attitudes of said drone comprise the pitch or the roll.

4. The drone according to claim 1, wherein the first device for memorizing predetermined altitude compensation data comprises altitude compensation data previously determined by measurement of the disturbances caused to said drone.

5. The drone according to claim 1:
   wherein the second device for determining the compensation to be applied determines the compensation to be applied based on signals delivered by said at least one attitude measurement sensor and by said at least one relative wind speed sensor and by combining these signals to the altitude compensation data memorized in the first device; and the third device for calculating the estimated altitude comprises means adapted to add the altitude delivered by the barometric sensor and the compensation to be applied to determine the estimated altitude.

\* \* \* \* \*